(12) United States Patent
Okada et al.

(10) Patent No.: US 11,225,771 B2
(45) Date of Patent: Jan. 18, 2022

(54) SHOVEL

(71) Applicant: SUMITOMO HEAVY INDUSTRIES, LTD., Tokyo (JP)

(72) Inventors: Junichi Okada, Kanagawa (JP); Kazunori Hiranuma, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 314 days.

(21) Appl. No.: 16/361,472

(22) Filed: Mar. 22, 2019

(65) Prior Publication Data

US 2019/0218746 A1     Jul. 18, 2019

Related U.S. Application Data

(63) Continuation of application No. PCT/JP2017/034808, filed on Sep. 26, 2017.

(30) Foreign Application Priority Data

Sep. 30, 2016  (JP) .............................. JP2016-194483

(51) Int. Cl.
| | |
|---|---|
| *E02F 3/43* | (2006.01) |
| *E02F 3/42* | (2006.01) |
| *E02F 3/32* | (2006.01) |
| *E02F 9/20* | (2006.01) |

(Continued)

(52) U.S. Cl.
CPC ............... *E02F 3/435* (2013.01); *E02F 3/32* (2013.01); *E02F 3/425* (2013.01); *E02F 9/2029* (2013.01); *E02F 9/226* (2013.01); *E02F 9/2285* (2013.01); *G05B 13/02* (2013.01)

(58) Field of Classification Search
CPC ... E02F 3/40; E02F 3/435; E02F 3/425; E02F 3/32; E02F 9/2029; E02F 9/226; E02F 9/2285; G05B 13/02
See application file for complete search history.

(56) References Cited

U.S. PATENT DOCUMENTS

| | | | |
|---|---|---|---|
| 6,317,669 B1 | 11/2001 | Kurenuma et al. | |
| 8,972,122 B2 * | 3/2015 | Magaki | E02F 3/435 |
| | | | 701/50 |
| 2014/0121840 A1 | 5/2014 | Mizuochi et al. | |

(Continued)

FOREIGN PATENT DOCUMENTS

| | | |
|---|---|---|
| EP | 2937473 | 10/2015 |
| EP | 2937475 | 10/2015 |

(Continued)

OTHER PUBLICATIONS

International Search Report for PCT/JP2017/034808 dated Jan. 9, 2018.

*Primary Examiner* — Jessica H Lutz
(74) *Attorney, Agent, or Firm* — IPUSA, PLLC

(57) ABSTRACT

A shovel includes a traveling body, an upper turning body turnably provided on the traveling body, an attachment including a boom, an arm, and a bucket and attached to the upper turning body, and a processor. The processor is configured to correct a motion of the boom cylinder of the attachment in such a manner as to control a lift of the rear of the traveling body with the front of the traveling body serving as a tipping fulcrum. The processor is configured to correct the motion of the boom cylinder based on a rod pressure and a bottom pressure of the boom cylinder.

10 Claims, 13 Drawing Sheets

(51) Int. Cl.
*E02F 9/22* (2006.01)
*G05B 13/02* (2006.01)

(56) References Cited

U.S. PATENT DOCUMENTS

| | | | | |
|---|---|---|---|---|
| 2015/0284930 | A1* | 10/2015 | Tsukamoto | E02F 9/2292 |
| | | | | 701/50 |
| 2016/0369480 | A1* | 12/2016 | Mizuochi | E02F 9/2207 |
| 2018/0298584 | A1* | 10/2018 | Okada | E02F 3/308 |
| 2019/0024344 | A1* | 1/2019 | Okui | E02F 9/26 |
| 2019/0078302 | A1* | 3/2019 | Yamada | E02F 3/43 |
| 2019/0284783 | A1* | 9/2019 | Moriki | E02F 9/261 |

FOREIGN PATENT DOCUMENTS

| | | |
|---|---|---|
| JP | S60-199130 | 10/1985 |
| JP | S62-248724 | 10/1987 |
| JP | 2009-155901 | 7/2009 |
| JP | 2014-122510 | 7/2014 |
| JP | 2016-169572 | 9/2016 |

* cited by examiner

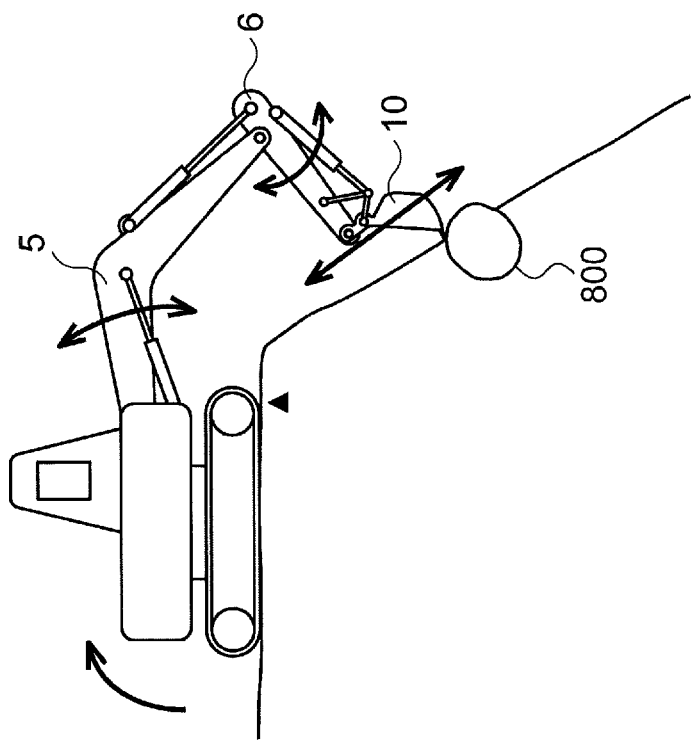
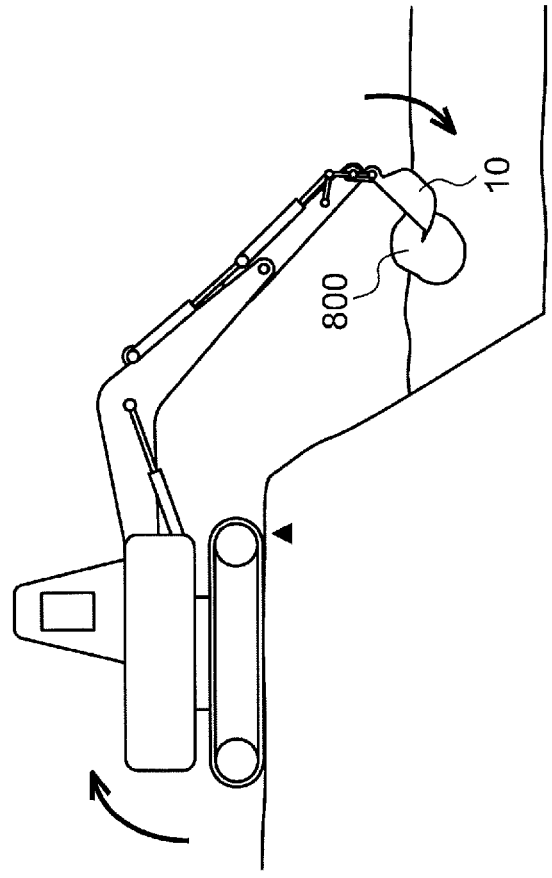

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/034808, filed on Sep. 26, 2017 and designating the U.S., which claims priority to Japanese patent application No. 2016-194483, filed on Sep. 30, 2016. The entire contents of the foregoing applications are incorporated herein by reference.

BACKGROUND

Technical Field

The present invention relates to shovels.

Description of Related Art

A shovel mainly includes a traveling body (also referred to as a crawler or lower frame), an upper turning body, and an attachment. The upper turning body is turnably attached to the traveling body, and has its position controlled by a turning motor. The attachment is attached to the upper turning body, and is used during work.

An operator controls the boom, arm, and bucket of the attachment according to the details of the work to be performed. At this point, a vehicle body (namely, the traveling body and the upper turning body) receives a reaction force from the attachment. The body of the shovel may be lifted depending on a direction in which the reaction force is applied, the attitude of the vehicle body, and ground conditions.

A technique to prevent a lift of a vehicle body by controlling the contraction-side (rod-side) pressure of a boom cylinder has been disclosed.

SUMMARY

According to an aspect of the present invention, a shovel includes a traveling body, an upper turning body turnably provided on the traveling body, an attachment including a boom, an arm, and a bucket and attached to the upper turning body, and a processor. The processor is configured to correct a motion of the boom cylinder of the attachment in such a manner as to control a lift of the rear of the traveling body with the front of the traveling body serving as a tipping fulcrum. The processor is configured to correct the motion of the boom cylinder based on a rod pressure and a bottom pressure of the boom cylinder.

BRIEF DESCRIPTION OF THE DRAWINGS

FIGS. 12A and 12B are diagrams illustrating other examples of rear lifts; and

DETAILED DESCRIPTION

Figure 1:
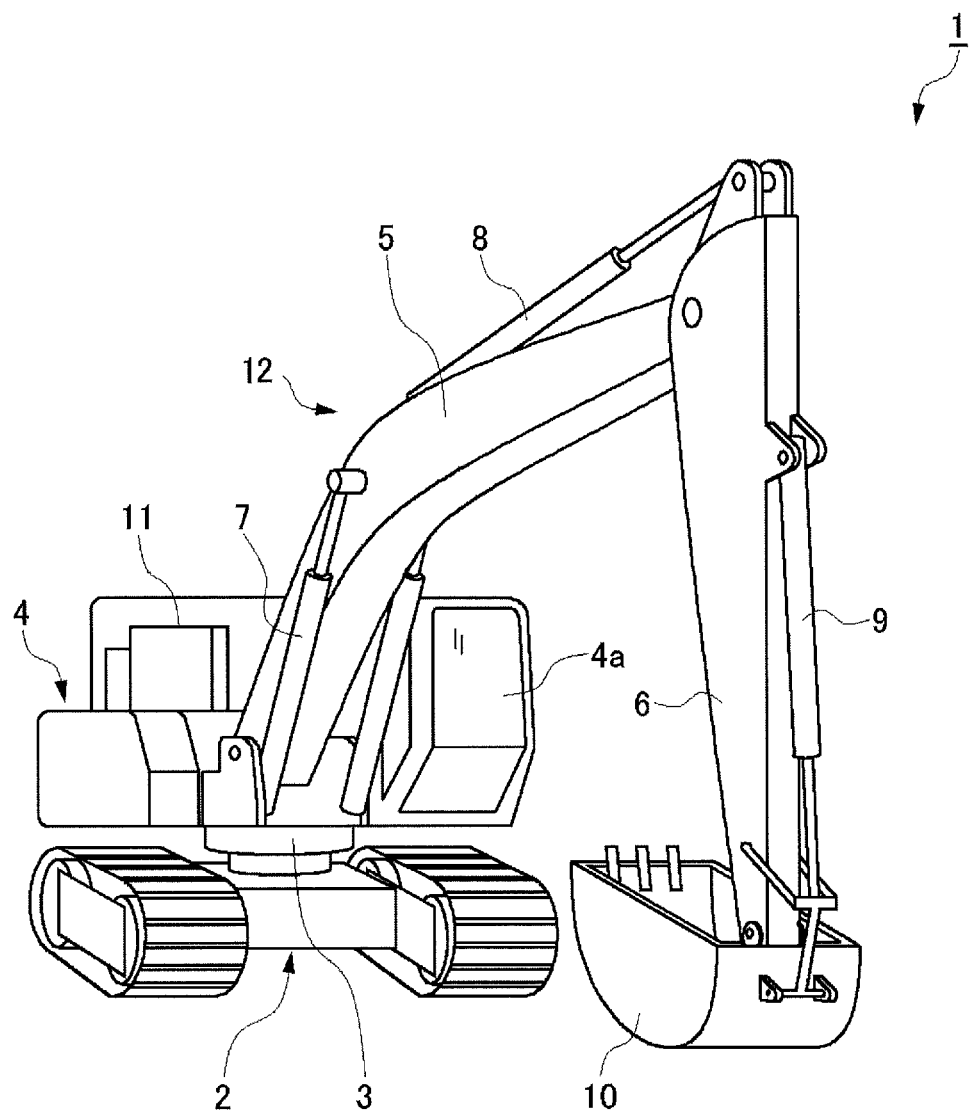
FIG. 1 is a perspective view illustrating an appearance of a shovel, which is an example of a construction machine according to an embodiment.

The inventors have studied shovels to recognize the following problem. Depending on the work condition of a shovel, the rear of a vehicle body may be lifted with the front of the vehicle body serving as a fulcrum, thus reducing work efficiency.

According to an aspect of the present invention, a shovel having a mechanism for controlling a lift of the rear of a vehicle body due to a motion of an attachment is provided.

According to an aspect of the present invention, it is possible to control a lift of the rear of the traveling body of a shovel.

The present invention is described below with reference to the drawings based on an embodiment. The same or equivalent constituent elements, members, or processes are assigned the same reference numeral, and duplicate description is suitably omitted. An embodiment does not limit the invention and is an illustration. All features and their combinations described in an embodiment are not necessarily essential to the invention.

In the specification, "the state that a member A is connected to a member B" includes not only the case where the member A and the member B are physically directly connected but also the case where the member A and the member B are indirectly connected through another member that does not substantially affect their electrical connection or impair a function or effect achieved by their coupling.

FIG. 1 is a perspective view illustrating an appearance of a shovel 1, which is an example of a construction machine according to an embodiment. The shovel 1 mainly includes a traveling body (also referred to as a lower frame or crawler) 2 and an upper turning body 4 turnably mounted on top of the traveling body 2 through a turning apparatus 3.

An attachment 12 is attached to the upper turning body 4. As the attachment 12, a boom 5, an arm 6 connected to the end of the boom 5 by a link, and a bucket 10 connected to the end of the arm 6 by a link are attached. The bucket 10 is means for capturing earth and sand or a hung load of a steel material or the like. The boom 5, the arm 6, and the bucket 10 are hydraulically driven with a boom cylinder 7, an arm cylinder 8, and a bucket cylinder 9, respectively. Furthermore, a cab 4a for accommodating an operator (driver) who manipulates the position, magnetizing operation, and releasing operation of the bucket 10 and power sources such as an engine 11 for generating hydraulic pressure are provided on the upper turning body 4.

Next, a lift of the rear of the shovel 1 and its control are described in detail.

The control of a lift by the shovel 1 can be understood as relaxing a stiff attachment to prevent transmission of the reaction or force of the attachment to a vehicle body.

Figure 2:
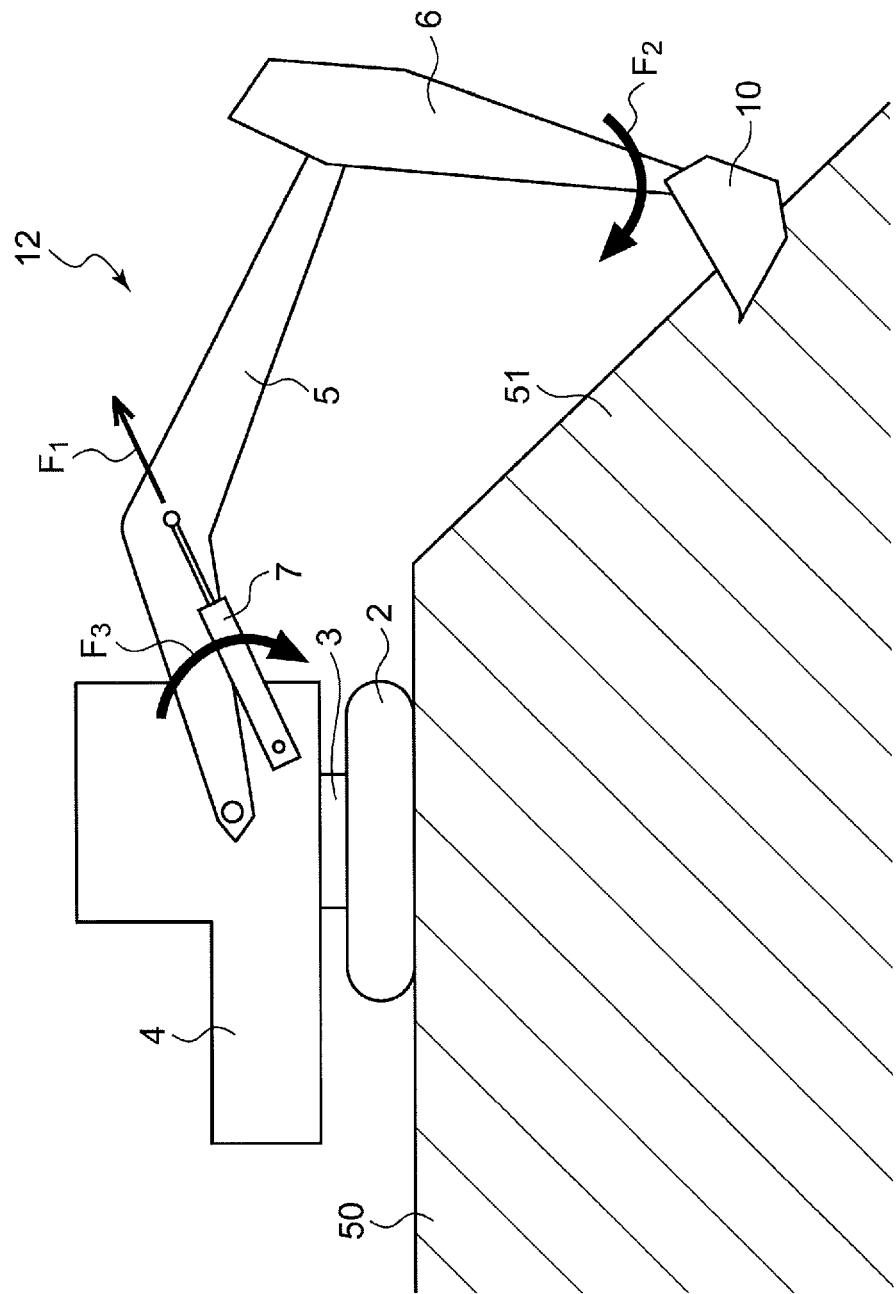
FIG. 2 is a diagram illustrating an example of a rear lift that occurs during work of the shovel.

FIG. 2 is a diagram illustrating an example of a rear lift that occurs during work of a shovel. The shovel 1 is excavating a ground 50. A force $F_2$ is generated such that the bucket 10 digs into a slope 51, and a force $F_3$ is generated such that the boom 5 holds the bucket 10 against the slope 51. At this point, the boom cylinder 7 exerts a reaction force $F_1$ on the vehicle body (the traveling body 2, the turning apparatus 3, and the turning body 4) of the shovel 1. When a force (torque) to tilt the vehicle body by the reaction force $F_1$ exceeds a force (torque) to hold the vehicle body against the ground based on the weight, the rear of the vehicle body is lifted.

As illustrated in FIG. 2, when the bucket 10 contacts and is caught on or dug into a target object, the boom 5 does not move and, accordingly, the rod of the boom cylinder 7 is not displaced, even when a force acts on the boom 5. As the pressure of the rod-side chamber increases, the force $F_1$ that lifts the boom cylinder 7 increases, so that the force (torque) $F_3$ to tilt the vehicle body forward increases.

Such a case may occur in deep digging in which the bucket 10 is positioned lower than the vehicle body (the traveling body 2) and in the leveling of a front slope as illustrated in FIG. 2, and may occur not only in the case of operating a boom but also in the case of operating an atm or bucket.

Figure 3:
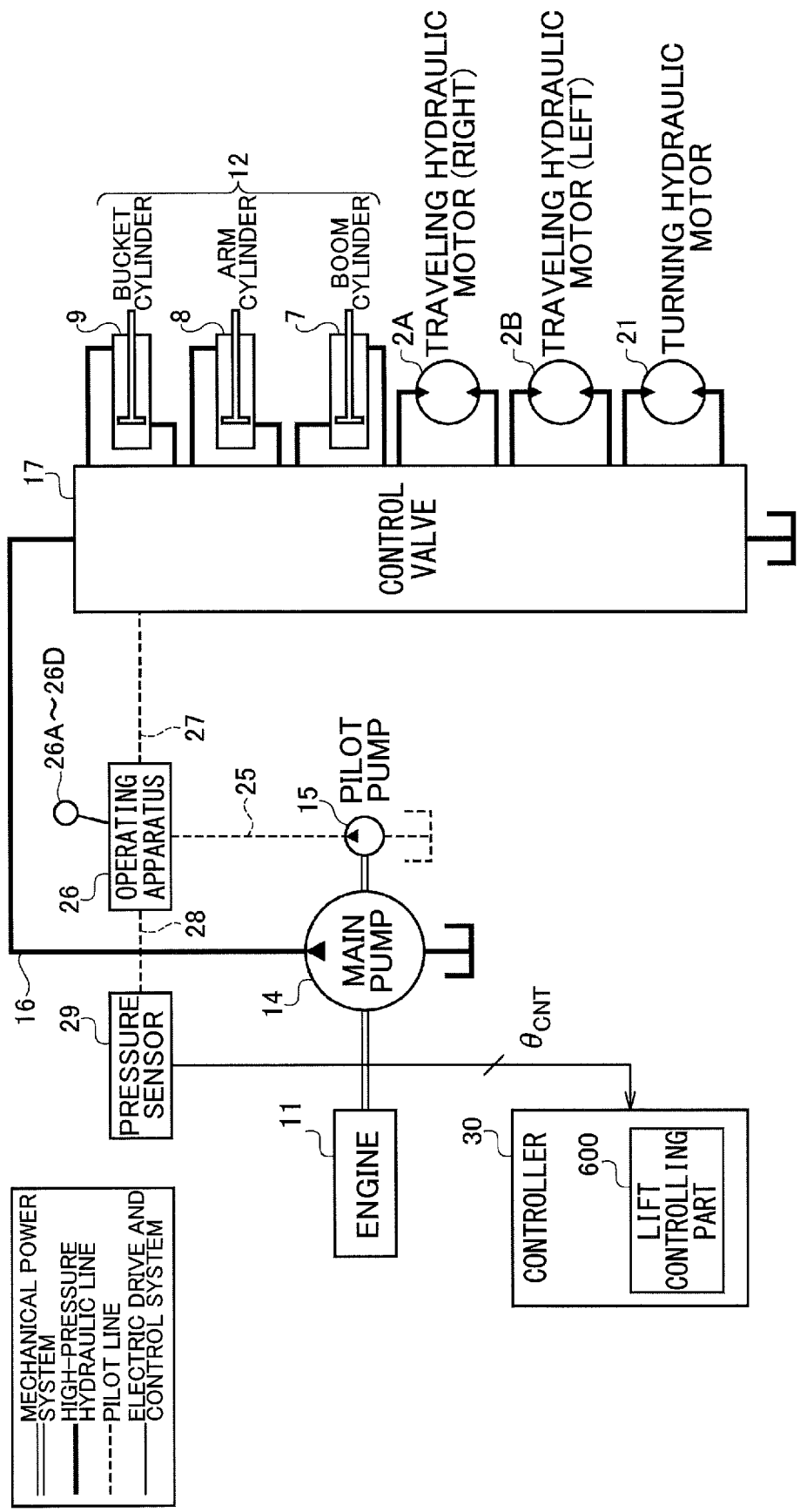
FIG. 3 is a block diagram of the electrical system and the hydraulic system of the shovel.

Next, a specific configuration of the shovel 1 that can control a rear lift is described. FIG. 3 is a block diagram of the electrical system and the hydraulic system of the shovel 1. In FIG. 3, a system that mechanically transmits power, a hydraulic system, an operating system, and an electrical system are indicated by a double line, a thick solid line, a dashed line, and a thin solid line, respectively. While a hydraulic shovel is discussed here, the present invention is also applicable to a hybrid shovel that uses an electric motor for turning.

The engine 11 is connected to a main pump 14 and a pilot pump 15. A control valve 17 is connected to the main pump 14 via a high-pressure hydraulic line 16. Two systems of hydraulic circuits may be provided to supply hydraulic pressure to hydraulic actuators. In this case, the main pump 14 includes two hydraulic pumps. For an easier understanding, the specification discusses the case of a single main pump system.

The control valve 17 is an apparatus that controls the hydraulic system of the shovel 1. In addition to traveling hydraulic motors 2A and 2B for driving the traveling body 2 illustrated in FIG. 1, the boom cylinder 7, the arm cylinder 8, and the bucket cylinder 9 are connected to the control valve 17 via high-pressure hydraulic lines. The control valve 17 controls hydraulic pressure (control pressure) to supply to these in accordance with an operator's operation input.

Furthermore, a turning hydraulic motor 21 for driving the turning apparatus 3 is connected to the control valve 17. While the turning hydraulic motor 21 is connected to the control valve 17 via the hydraulic circuit of a turning controller, the hydraulic circuit of the turning controller is not illustrated in FIG. 3 for simplification.

An operating apparatus 26 (an operation part) is connected to the pilot pump 15 via a pilot line 25. The operating apparatus 26, which is an operation part for operating the traveling body 2, the turning apparatus 3, the boom 5, the arm 6, and the bucket 10, is operated by the operator. The control valve 17 is connected to the operating apparatus 26 via a hydraulic line 27, and a pressure sensor 29 is connected to the operating apparatus 26 via a hydraulic line 28.

For example, the operating apparatus 26 includes hydraulic pilot type operating levers 26A through 26D. The operating levers 26A through 26D are operating levers corresponding to a boom axis, an arm axis, a bucket axis, and a turning axis, respectively. In practice, two operating levers are provided with two axes being assigned to the forward and backward directions and the left and right directions of one of the two operating levers and the remaining two axes being assigned to the forward and backward directions and the left and right directions of the other of the two operating levers. Furthermore, the operating apparatus 26 includes pedals for controlling a traveling axis.

The operating apparatus 26 converts hydraulic pressure (primary-side hydraulic pressure) supplied through the pilot line 25 into hydraulic pressure commensurate with the amount of operation of the operator (secondary-side hydraulic pressure) and outputs the converted hydraulic pressure. The secondary-side hydraulic pressure output from the operating apparatus 26 (control pressure) is supplied to the control valve 17 through the hydraulic line 27 and is detected by the pressure sensor 29. That is, the detection values of the pressure sensor 29 represent operation inputs $\theta_{CNT}$ of the operator to the operating levers 26A through 26D. While the hydraulic line 27 is drawn as a single line in FIG. 3, in practice, there are hydraulic lines for control command values for the left traveling hydraulic motor 2B, the right traveling hydraulic motor 2A, and the turning hydraulic motor 21.

A controller 30 is a main control part that controls the driving of the shovel 1. The controller 30, which is composed of a processing unit that includes a CPU (Central Processing Unit) and an internal memory, is implemented by the CPU executing a program for drive control loaded into the memory.

Furthermore, the shovel 1 includes a lift controlling part 600. The lift controlling part 600 corrects the motion of the boom cylinder 7 of the attachment 12 such that a lift of the rear of the traveling body 2 toward the back of the attachment 12 in its extension direction is controlled. A main part of the lift controlling part 600 may be configured as part of the controller 30.

Figure 4:
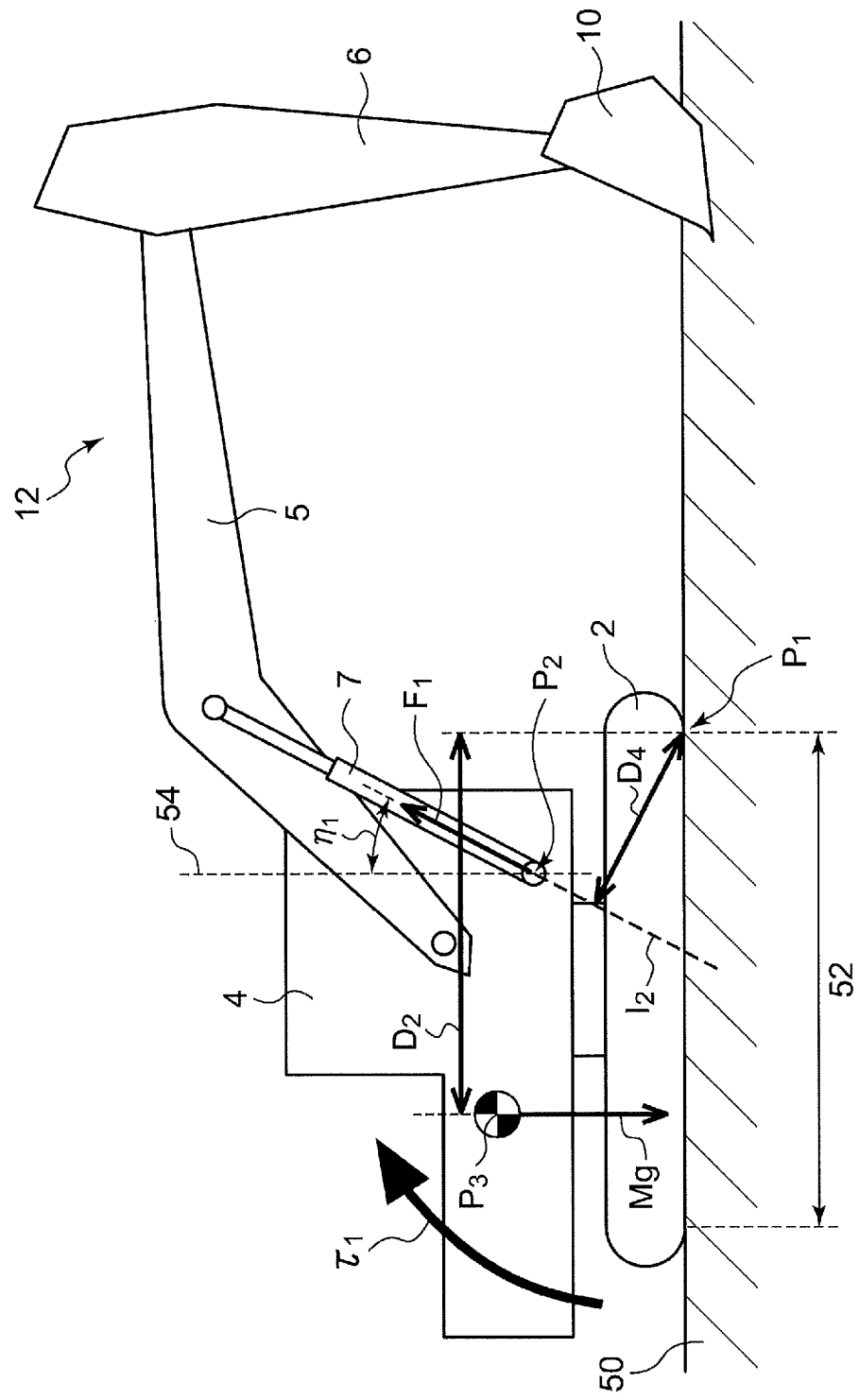
FIG. 4 is a diagram illustrating a mechanical model of a shovel regarding a rear lift.

FIG. 4 is a diagram illustrating a mechanical model of a shovel regarding the rear lift.

$D_2$ represents the distance between the center of gravity $P_3$ of the vehicle body of the shovel and the front tipping fulcrum $P_1$ of the traveling body 2. The tipping fulcrum $P_1$ may be regarded as the foremost end of an effective grounding area 52 of the traveling body 2 in the extension direction of the attachment 12 (the orientation of the turning body 4).

Furthermore, $D_4$ represents the distance between an extension line $I_2$ of the boom cylinder 7 and the tipping fulcrum $P_1$. $F_1$ is the force exerted on the upper turning body 4 by the boom cylinder 7, M is the weight of the vehicle body, and g is gravitational acceleration. At this point, a torque $\tau_1$ to tilt the vehicle body forward around the tipping fulcrum $P_1$ is expressed by Eq. (1):

$$\tau_1 = D_4 \times F_1. \quad (1)$$

A torque $\tau_2$ to hold the vehicle body against the ground around the tipping fulcrum $P_1$ by gravity is expressed by Eq. (2):

$$\tau_2 = D_2 Mg. \quad (2)$$

A condition for stabilizing the vehicle body without a lift of its rear is:

$$\tau_1 < \tau_2. \tag{3}$$

By plugging Eqs. (1) and (2) thereinto, Inequality (4) is obtained as a stabilizing condition:

$$D_4 F_1 < D_2 Mg. \tag{4}$$

That is, the lift controlling part 600 may correct the motion of the boom cylinder 7 such that Inequality (4) holds.

First Example Configuration

Figure 5:
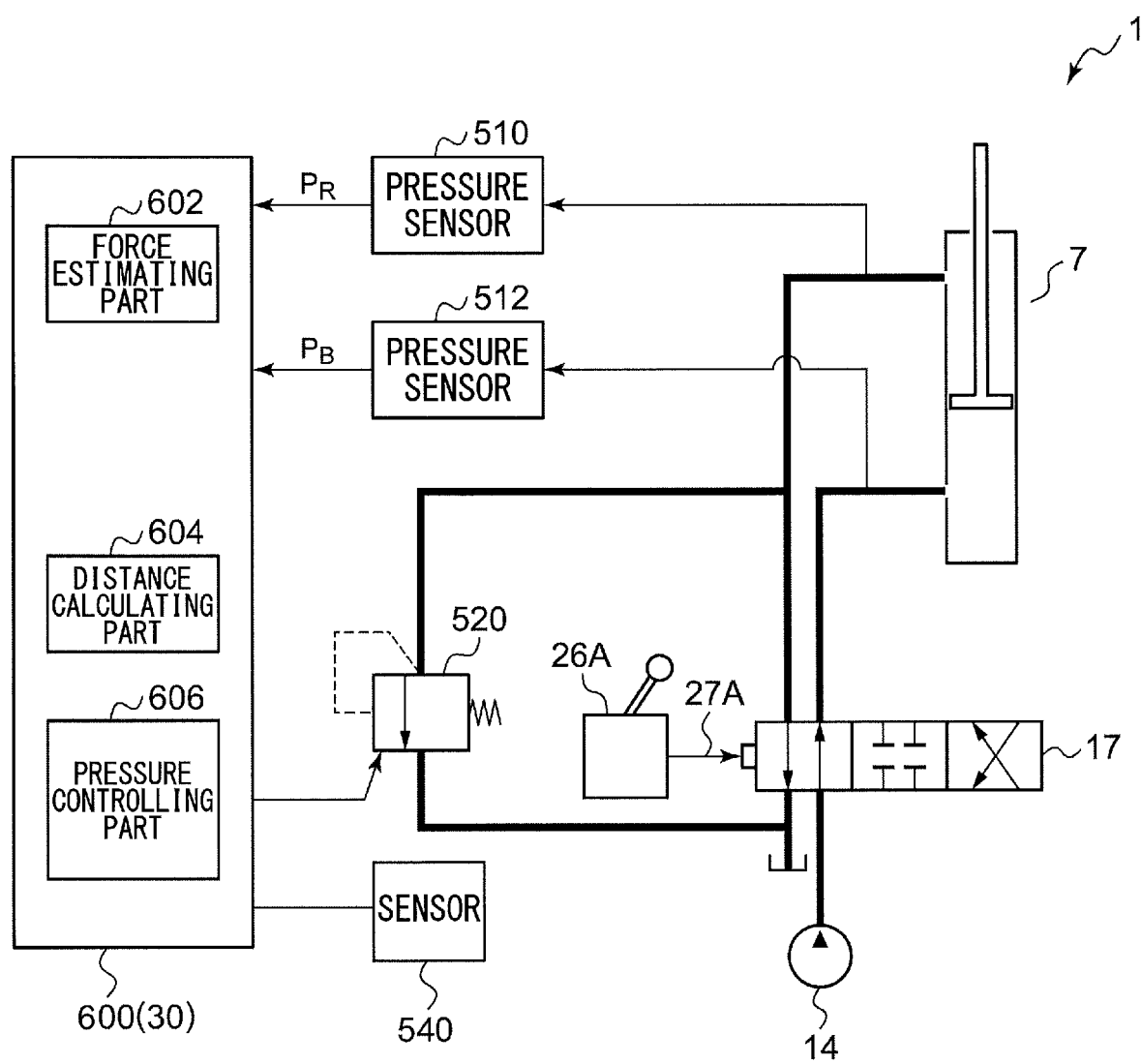
FIG. 5 is a block diagram of a lift controlling part of the shovel and its periphery according to a first example configuration.

FIG. 5 is a block diagram of the lift controlling part 600 of the shovel 1 and its periphery according to a first example configuration. Pressure sensors 510 and 512 measure the pressure of the rod-side oil chamber (rod pressure) $P_R$ and the pressure of the bottom-side oil chamber (bottom pressure) $P_B$, respectively, of the boom cylinder 7. The measured pressures $P_R$ and $P_B$ are input to the lift controlling part 600 (the controller 30).

The lift controlling part 600 includes a force estimating part 602, a distance calculating part 604, and a pressure controlling part 606.

The force $F_1$ is expressed by a function $f(P_R, P_B)$ of the pressures $P_R$ and $P_B$:

$$F_1 = f(P_R, P_B). \tag{5}$$

The force estimating part 602 calculates the force $F_1$ exerted on the turning body 4 by the boom cylinder 7, based on the rod pressure $P_R$ and the bottom pressure $P_B$.

By way of example, letting a rod-side pressure receiving area and a bottom-side pressure receiving area be $A_R$ and $A_B$, respectively, $F_1$ can be expressed as $F_1 = A_R \cdot P_R - A_B \cdot P_B$. The force estimating part 602 may calculate or estimate the force $F_1$ based on this equation.

The distance calculating part 604 obtains the distances $D_2$ and $D_4$ or obtains their ratio $D_2/D_4$. The position of the center of gravity $P_3$ of the vehicle body excluding the attachment 12 is constant irrespective of the turning angle θ of the turning body 4, while the position of the tipping fulcrum $P_1$ changes depending on the turning angle θ. Accordingly, the distance $D_2$ may actually vary depending on the turning angle θ of the turning body 4. In the simplest manner, however, the distance $D_2$ may be treated as a constant.

The distance $D_4$ may be geometrically calculated based on the position of the tipping fulcrum $P_1$ and the angle of the boom cylinder 7 (for example, an angle $\eta_1$ formed by the boom cylinder 7 and a vertical axis 54). The angle $\eta_1$ may be geometrically calculated from the extension length of the boom cylinder 7, the size of the shovel 1, the tilt of the vehicle body of the shovel 1, etc. Alternatively, a sensor for measuring the angle $\eta_1$ may be provided, and the output of the sensor may be used.

The pressure controlling part 606 controls the pressure of the boom cylinder 7 based on the force $F_1$ and the distances $D_2$ and $D_4$ such that Inequality (4) holds. According to this example configuration, the pressure controlling part 606 controls the rod pressure $P_R$ of the boom cylinder 7 such that Inequality (4) holds.

A solenoid proportional relief valve 520 is provided between the bottom-side oil chamber of the boom cylinder 7 and a tank. The pressure controlling part 606 controls the solenoid proportional relief valve 520 to relieve the cylinder pressure of the boom cylinder 7 such that Inequality (4) holds. As a result, the rod pressure $P_R$ decreases to reduce $F_1$, so that it is possible to control the rear lift.

The state of a spool of the control valve 17 for controlling the boom cylinder 7, namely, the direction of hydraulic oil supplied from the main pump 14 to the boom cylinder 7, is not limited in particular, and may be a reverse direction or blocked instead of a forward direction as in FIG. 5, depending on the condition of the attachment 12 (the contents of work).

Second Example Configuration

Figure 6:
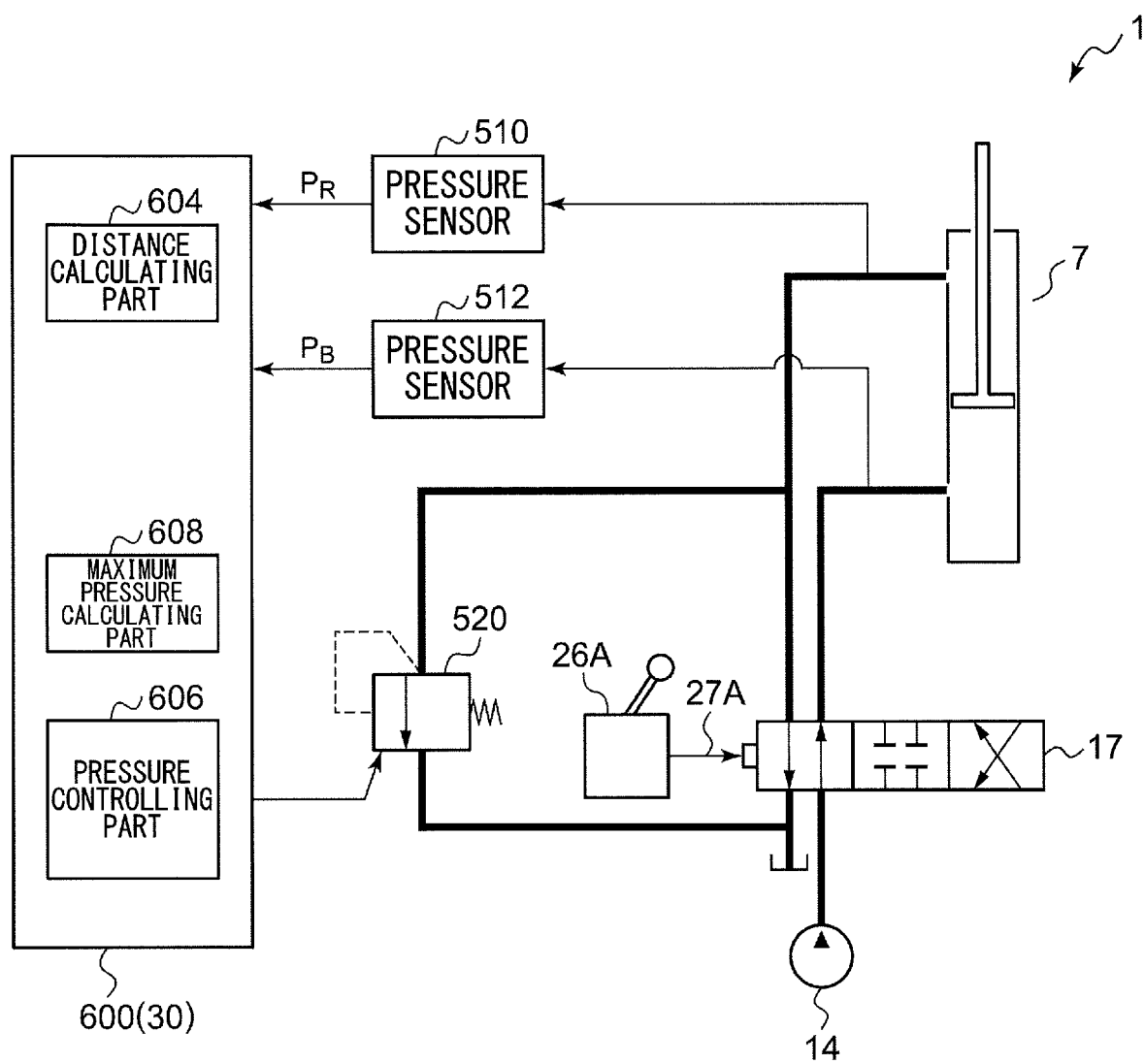
FIG. 6 is a block diagram illustrating the lift controlling part according to a second example configuration.

FIG. 6 is a block diagram illustrating the lift controlling part 600 according to a second example configuration. A relational expression (6) is obtained by transforming Inequality (4) as follows:

$$F_1 < D_2/D_4 \times Mg. \tag{6}$$

That is, $D_2/D_4 \times Mg$ is the maximum allowable value $F_{MAX}$ of the force $F_1$.

Furthermore, the rod pressure $P_R$ may also be expressed as a function $g(P_1, P_B)$ of the force $F_1$ and the bottom pressure $P_B$:

$$P_R = g(F_1, P_B). \tag{7}$$

Accordingly, it is possible to calculate a maximum value (maximum pressure) $P_{RMAX}$ that the rod pressure $P_R$ can take:

$$P_{RMAX} = g(F_{MAX}, P_B). \tag{8}$$

A maximum pressure calculating part 608 calculates the maximum allowable pressure $P_{RMAX}$ of the rod pressure $P_R$ based on Eq. (8). The pressure controlling part 606 controls the solenoid proportional relief valve 520 such that the rod pressure $P_R$ detected by the pressure sensor 510 does not exceed the maximum pressure $P_{RMAX}$.

A person having ordinary skill in the art would appreciate that it is possible to so control the rod pressure $P_R$ as to satisfy Inequality (4) in a manner other than as shown in FIGS. 5 and 6.

Third Example Configuration

Figure 7:
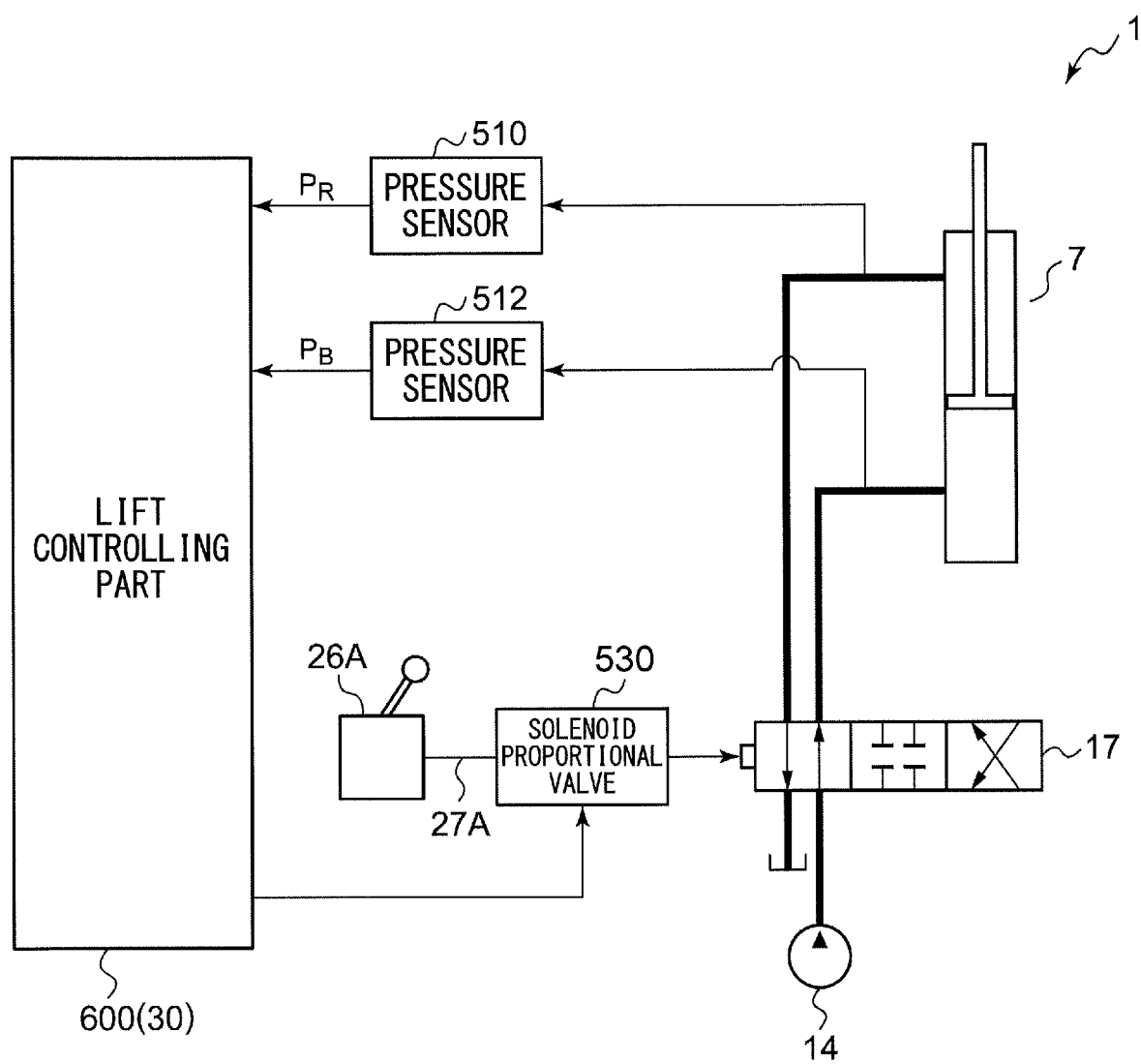
FIG. 7 is a block diagram of the lift controlling part of the shovel and its periphery according to a third example configuration.

FIG. 7 is a block diagram of the lift controlling part 600 of the shovel 1 and its periphery according to a third example configuration. The shovel 1 of FIG. 7 includes a solenoid proportional control valve 530 in place of the solenoid proportional relief valve 520 of the shovel 1 of FIG. 5. The solenoid proportional control valve 530 is provided in a pilot line 27A from the operating lever 26A to the control valve 17. The lift controlling part 600 varies a control signal to the solenoid proportional control valve 530 to vary a pressure to the control valve 17, thereby varying the bottom chamber side pressure and the pressure of the rod-side oil chamber of the boom cylinder 7, such that Inequality (4) is satisfied.

The configuration and control system of the lift controlling part 600 of FIG. 7 are not limited, and the configuration and control system of FIG. 5 or 6 or other configurations and control systems may be adopted.

The shovel 1 is configured as described above. Next, its operation is described.

Figure 8:
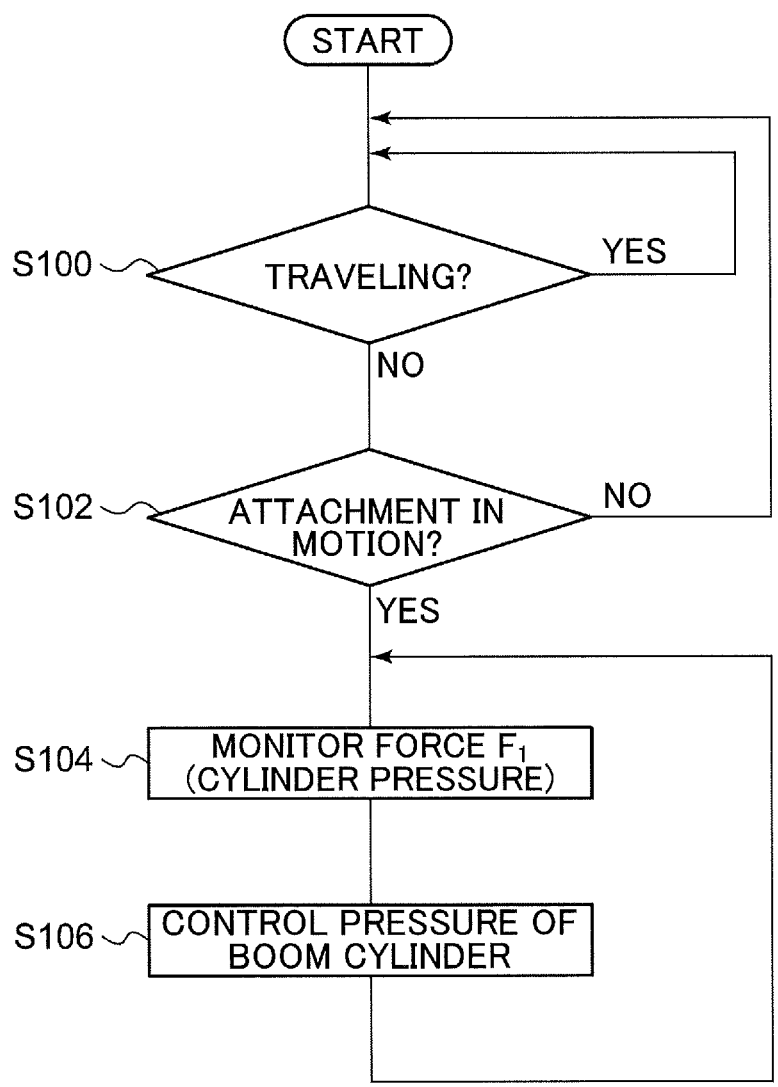
FIG. 8 is a flowchart of rear lift correction according to the embodiment.

FIG. 8 is a flowchart of rear lift correction according to the embodiment. First, it is determined whether the shovel 1 is traveling (S100). If the shovel is traveling (YES at S100), the flow returns again to the determination of S100. If the shovel 1 is not traveling and is stopped (NO at S100), it is determined whether the attachment 12 is in motion (S102). If the attachment is not in motion (NO at S102), the flow returns to step S100. If a motion of the attachment 12 is detected (YES at S102), a lift controlling process is enabled.

In the lift controlling process, the bottom pressure $P_B$ and the rod pressure $P_R$ of the boom cylinder 7 and the force $F_1$ that the boom 5 exerts on the vehicle body are monitored (S104). The pressure of the boom cylinder 7 is controlled such that no lift occurs, more specifically, such that Inequality (4) is satisfied (S106).

The shovel 1 operates as described above. According to the shovel 1 of the embodiment, it is possible to prevent a lift of a shovel before its occurrence.

Figure 9A:
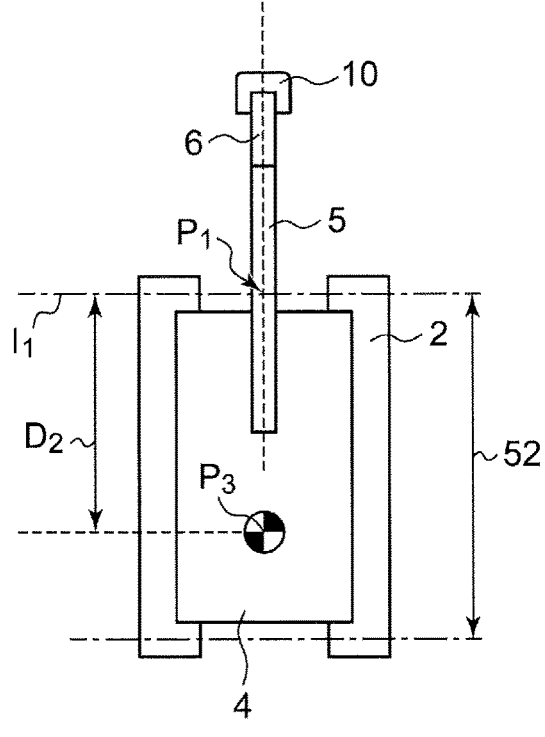
FIGS. 9A through 9C are diagrams illustrating the relationship between the turning angle θ of a turning body and a tipping fulcrum.
Figure 9B:
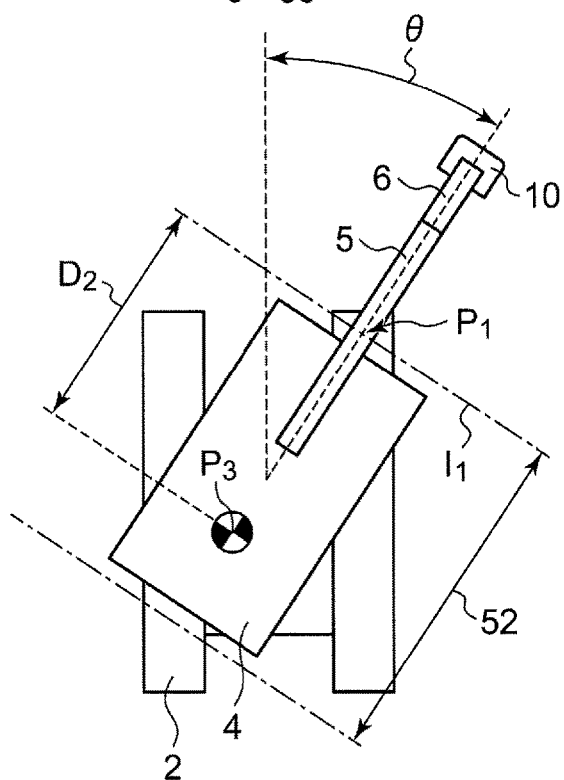
Figure 9C:
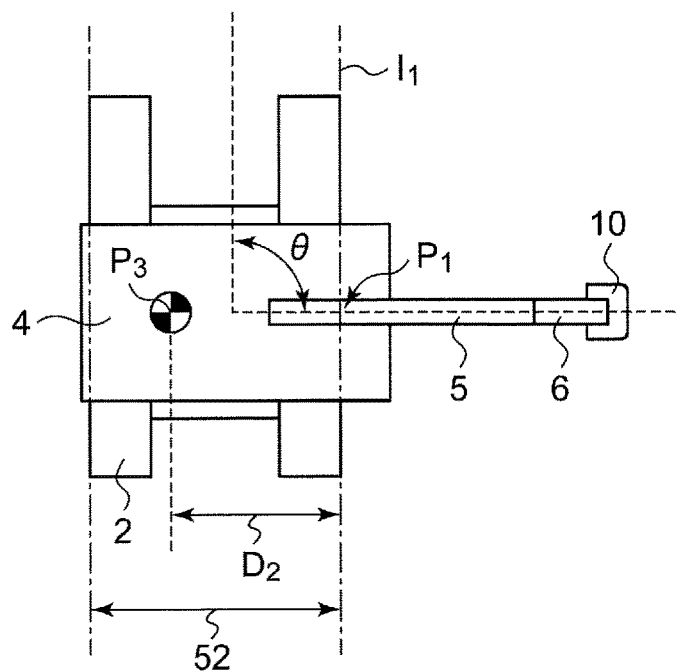

Next, the distances $D_2$ and $D_4$ are described in detail. FIGS. 9A through 9C are diagrams illustrating the relationship between the turning angle $\theta$ of the turning body 4 and the tipping fulcrum $P_1$. $I_1$ denotes a line that is orthogonal to the extension direction of the attachment 12 (the orientation of the turning body 4) and passes through the foremost end of the effective grounding area 52 in the extension direction of the attachment 12. The tipping fulcrum $P_1$ is on this line $I_1$. As illustrated in FIGS. 9A through 9C, the distance $D_2$ varies in accordance with the turning angle $\theta$ of the turning body 4. Therefore, the lift controlling part 600 may geometrically calculate the distance $D_2$. Alternatively, the lift controlling part 600 may store the relationship between the turning angle $\theta$ and the distance $D_2$ in a lookup table and obtain the distance $D_2$ referring to it. The method of detecting the turning angle $\theta$ is not limited in particular.

Although not illustrated in FIGS. 9A through 9C, the distance $D_4$ between the tipping fulcrum $P_1$ and the extension line $I_2$ of the boom cylinder 7 may be obtained based on the turning angle $\theta$ of the turning body 4 and an angle $\eta$ of the boom cylinder 7.

Next, another method of obtaining the distances $D_2$ and $D_4$ is described, referring back to FIG. 5. The shovel 1 may include a sensor 540 including one or more of an acceleration sensor, a velocity sensor, a gyro sensor, etc. The sensor 540 detects a rotation of the vehicle body of the shovel 1 around a pitch axis.

The lift controlling part 600 detects the instant of a lift of the traveling body 2 (the vehicle body) based on the output of the sensor 540. At (immediately before) the time of a lift, Eq. (9) holds:

$$D_4 F_{1\_INIT} = D_2 Mg, \quad (9)$$

where $F_{1\_INIT}$ is the force $F_1$ at the time of a lift. The lift controlling part 600 obtains the force $F_{1\_INIT}$ and determines the relational expression (9) of the distances $D_2$ and $D_4$.

After obtaining this relational expression, the lift controlling part 600 may correct the force $F_1$ such that Inequality (4) or (6) holds. For example, $D_2/D_4 = F_{1\_INIT}/Mg$ may be calculated and the force $F_1$ may be controlled based on Inequality (6).

Alternatively, the position of the tipping fulcrum $P_1$ may be calculated using the relational expression (9) and each of the distances $D_2$ and $D_4$ may be calculated using the calculated tipping fulcrum $P_1$. Thus, by detecting the instant of a lift, it is possible to obtain the distances $D_2$ and $D_4$ without the turning angle $\theta$ of the turning body 4.

The present invention is described above based on an embodiment. A person having ordinary skill in the art would appreciate that the present invention is not limited to the above-described embodiment, that various design changes may be made, that various variations may be made, and that such variations are within the scope of the present invention. Such variations are described below.

[Variation 1]

It is theoretically possible to control a lift with correction of the motion of the attachment 12 being transparent to the operator by performing the correction at high speed. If a response delay increases, however, the operator may feel a gap between the operator's own operation and the motion of the attachment 12. Therefore, the shovel 1 may notify the operator of and alert the operator to the occurrence of a lift in parallel with correction of the motion of the attachment 12. The controller 30 may perform this notification and alert using aural means such as an audio message and an alarm sound, visual means such as display and warning light, and tactile (physical) means such as vibrations.

This makes it possible for the operator to recognize that the gap between the operation and the motion is attributed to automatic correction of the motion of the attachment 12. Furthermore, when this notification occurs in succession, the operator can recognize the improperness of the operator's own operation, and the operation is assisted.

[Variation 2]

Figure 10:
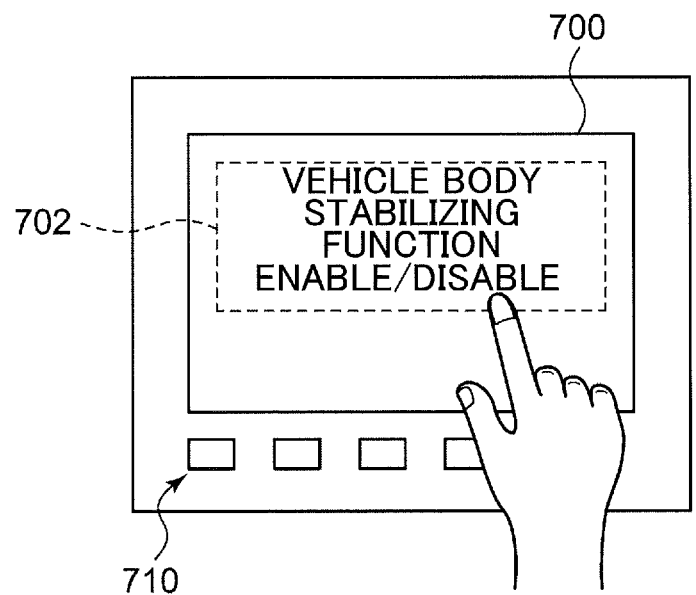
FIG. 10 is a diagram illustrating a display and an operation part provided in the cab of the shovel.

The operation may desire to intentionally use a lift of the vehicle body. Therefore, the operator may turn on and off a lift controlling function. FIG. 10 is a diagram illustrating a display 700 and an operation part 710 provided in the cab 4a of the shovel 1. For example, a dialog 702 or icon asking the operator whether to turn on or off (enable or disable) the lift controlling function is displayed on the display 700. The operator determines whether to enable or disable the lift controlling function using the operation part 710. The operation part 710 may be a touchscreen, and the operator may specify enabling or disabling by touching an appropriate part of the display.

Figure 11A:
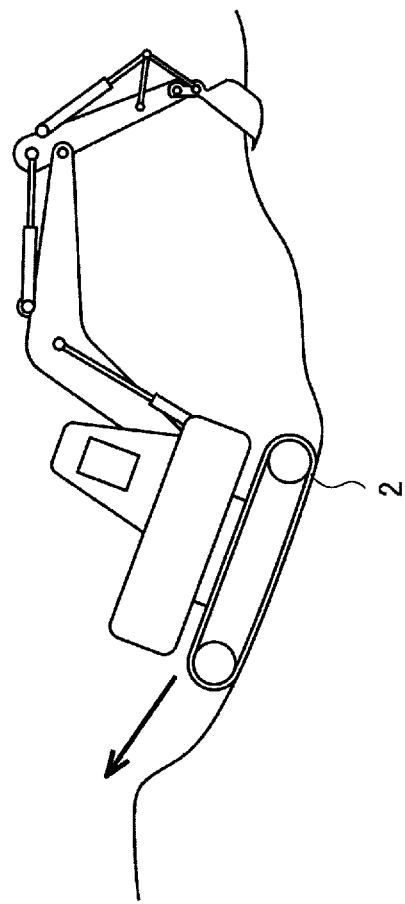
FIGS. 11A and 11B are diagrams illustrating situations where a lift controlling function is to be disabled.
Figure 11B:
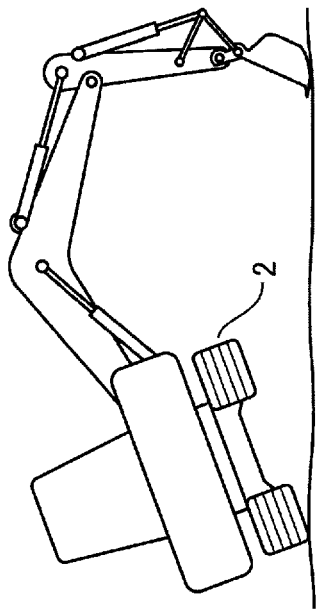

FIGS. 11A and 11B are diagrams illustrating situations where the lift controlling function is to be disabled. FIG. 11A is the case where the traveling body 2 is stuck in a deep part and tries to get out of it. When propulsion by the traveling body 2 is not suitably obtained, it is possible to get out of a deep part by operating the attachment 12 to positively lift or slide the traveling body 2.

FIG. 11B is the case where it is desired to remove mud from a crawler (caterpillar) of the traveling body 2. By lifting and idling a crawler on one side using the attachment 12, it is possible to remove mud from the crawler. In this case as well, the lift controlling function is to be disabled.

[Variation 3]

While a lift due to a boom operation is described with reference to FIG. 2, the application of the present invention is not limited to this. FIGS. 12A and 12B are diagrams illustrating other examples of rear lifts. FIG. 12A illustrates a state where the bucket 10 contacts a hard rock 800 when the bucket 10 is operated to scoop earth and sand into the bucket 10. In this case, the rear is going to be lifted with the front serving as a fulcrum.

FIG. 12B illustrates slope finishing work. According to this work, the bucket 10 is moved along a slope and the boom and the arm are simultaneously operated. During this work, when the bucket 10 hits the rock 800 embedded in the slope, the rear is going to be lifted with the front serving as a fulcrum. In the situations as in FIGS. 12A and 12B as well, the above-described lift controlling function works effectively.

[Variation 4]

A lift of the front with the rear serving as a fulcrum is described. Depending on the attitude of the vehicle body or a ground condition, the front of a shovel may be lifted with the rear serving as a fulcrum.

Figure 13:
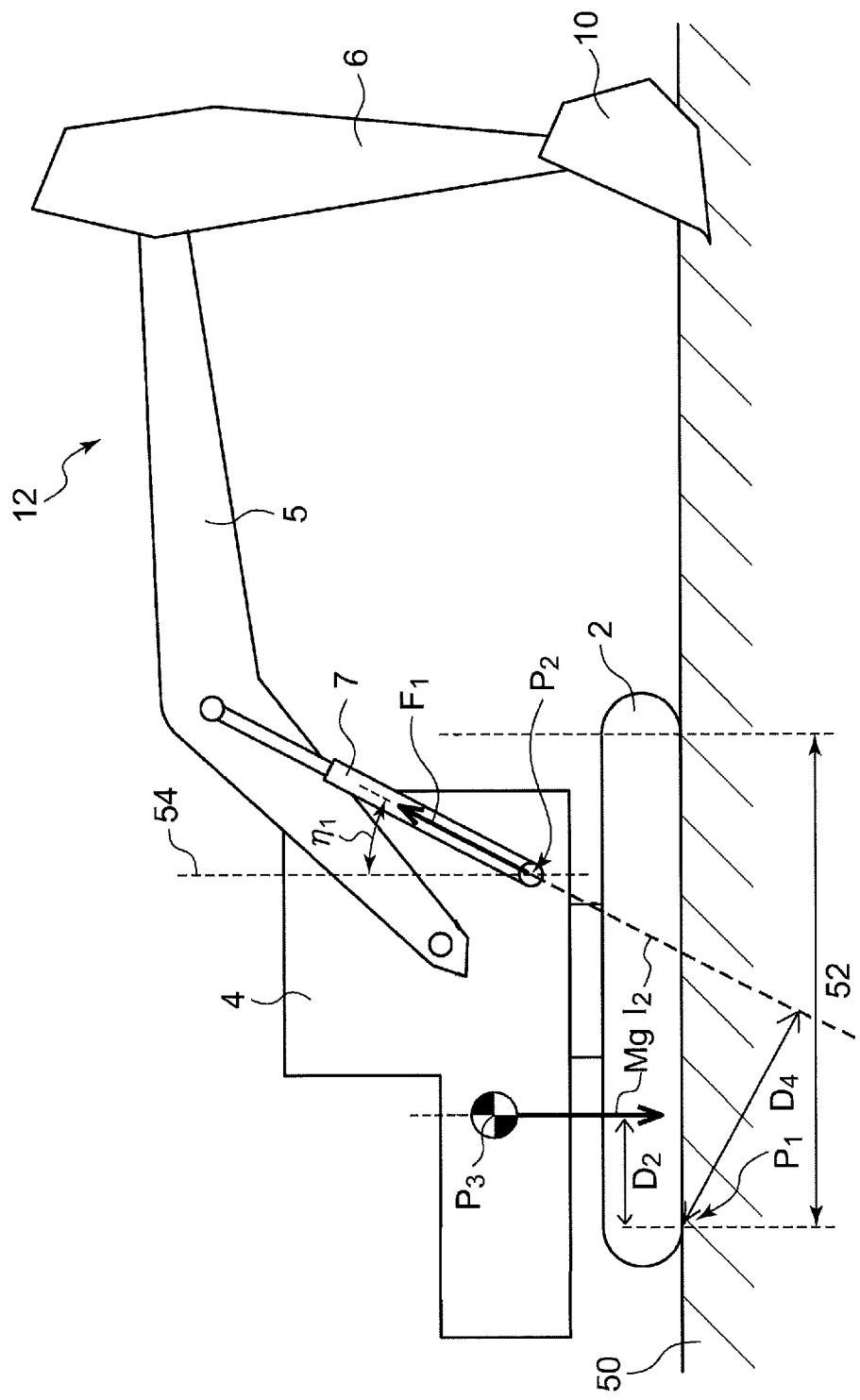
FIG. 13 is a diagram illustrating a mechanical model of a shovel with respect to a front lift.

FIG. 13 is a diagram illustrating a mechanical model of a shovel with respect to the front lift. $D_2$ represents the distance between the center of gravity $P_3$ of the vehicle body of the shovel and the rear tipping fulcrum $P_1$ of the traveling body 2. The tipping fulcrum $P_1$ may be regarded as the rearmost end of the effective grounding area 52 of the traveling body 2 in the extension direction of the attachment 12 (the orientation of the turning body 4).

Furthermore, $D_4$ represents the distance between the extension line $I_2$ of the boom cylinder 7 and the tipping fulcrum $P_1$. $F_1$ is the force exerted on the upper turning body 4 by the boom cylinder 7, M is the weight of the vehicle body, and g is gravitational acceleration. At this point, a torque $\tau_1$ to tilt the vehicle body counterclockwise around the tipping fulcrum $P_1$ (namely, a torque to lift the vehicle body) is expressed by Eq. (10):

$$\tau_1 = D_4 \times F_1. \quad (10)$$

The torque $\tau_2$ to tilt the vehicle body clockwise around the tipping fulcrum $P_1$ by gravity (namely, a torque to hold the vehicle body against the ground) is expressed by Eq. (11):

$$\tau_2 = D_2 Mg. \quad (11)$$

A condition for stabilizing the vehicle body without a lift of its front is:

$$\tau_1 < \tau_2. \quad (12)$$

By plugging Eqs. (10) and (11) thereinto, Inequality (13) is obtained as a stabilizing condition:

$$D_4 F_1 < D_2 Mg. \quad (13)$$

That is, the lift controlling part 600 may correct the motion of the boom cylinder 7 such that Inequality (13) holds.

According to the embodiment, a lift is controlled by controlling the pressure of the boom cylinder 7, while the pressures of the arm cylinder and the bucket cylinder may be additionally controlled.

According to an aspect of the present invention, a shovel includes a traveling body, an upper turning body turnably provided on the traveling body, an attachment including a boom, an arm, and a bucket and attached to the upper turning body, and a lift controlling part configured to correct the motion of the boom cylinder of the attachment in such a manner as to control a lift of the rear of the traveling body with the front of the traveling body serving as a tipping fulcrum.

By correcting the motion of the boom cylinder, it is possible to control a reaction force exerted on the vehicle body by the attachment, so that it is possible to control a rear lift.

The lift controlling part may correct the motion of the boom cylinder based on a force exerted on the upper turning body by the boom cylinder.

The lift controlling part may correct the motion of the boom cylinder based on the rod pressure and the bottom pressure of the boom cylinder.

The lift controlling part may control the rod pressure of the boom cylinder. For example, it is possible to control a rear lift by providing a relief valve on the rod side of the boom cylinder to prevent the rod pressure from becoming too high. Alternatively, the rod pressure may be prevented from becoming too high by providing a solenoid control valve in a pilot line to a control valve of the boom cylinder to control a pilot pressure.

The lift controlling part may correct the motion of the boom cylinder such that $D_4 F_1 < D_2 Mg$ holds, where $D_2$ is the distance between the center of gravity of the vehicle body of the shovel and the tipping fulcrum of the traveling body, D4 is the distance between an extension line of the boom cylinder and the tipping fulcrum, $F_1$ is a force exerted on the upper turning body by the boom cylinder, M is the weight of the vehicle body, and g is gravitational acceleration.

The rear lift may be controlled by controlling $F_1$ such that $F_1 < D_2/D_4 \times Mg$ holds with $D_2/D_4 \times Mg$ being a maximum allowable value $F_{MAX}$ of the force $F_1$.

Here, $F_1$ may be calculated based on a rod pressure $P_R$ and a bottom pressure $P_B$ of the boom cylinder.

The position of the tipping fulcrum may be changed in accordance with the orientation of the upper turning body.

The distances $D_4$ and $D_2$ or the ratio thereof may be obtained based on the force $F_1$ at the time of the lift of the traveling body.

The position of the tipping fulcrum may be fixed irrespective of the orientation of the upper turning body.

Any combinations of the above-described constituent elements and a method, an apparatus, and a system among which constituent elements and expressions of the present invention are interchanged are also valid as embodiments of the present invention.

The present invention is described using specific terms based on an embodiment. The embodiment, however, merely illustrates the principle and applications of the present invention, and many variations and replacements may be made with respect to the embodiment without departing from the idea of the present invention defined in the claims.

Embodiments of the present invention are applicable to industrial machines.

What is claimed is:

1. A shovel comprising:
    a traveling body;
    an upper turning body turnably provided on the traveling body;
    an attachment including a boom, an arm, and a bucket and attached to the upper turning body; and
    a processor configured to correct a motion of a boom cylinder of the attachment in such a manner as to control a lift of a rear of the traveling body with a front of the traveling body serving as a tipping fulcrum,
    wherein the processor is configured to correct the motion of the boom cylinder based on a rod pressure and a bottom pressure of the boom cylinder.

2. The shovel as claimed in claim 1, wherein the processor is configured to correct the motion of the boom cylinder based on a force exerted on the upper turning body by the boom cylinder.

3. The shovel as claimed in claim 1, further comprising:
    a sensor configured to detect a rotation of the shovel around a pitch axis, the sensor being at least one of an acceleration sensor, a velocity sensor, and a gyro sensor,
    wherein the processor is configured to correct the motion of the boom cylinder based on an output of the sensor.

4. The shovel as claimed in claim 1, wherein the processor is configured to correct the motion of the boom cylinder on condition that the shovel is not traveling and the attachment is in operation.

5. The shovel as claimed in claim 4, wherein the processor is configured to correct the motion of the boom cylinder while at least one of the boom, the arm, and the bucket is in operation.

6. The shovel as claimed in claim 1, wherein the processor is configured to correct the motion of the boom cylinder such that $D_4 F_1 < D_2 Mg$ holds, where $D_2$ is a distance between a center of gravity of a vehicle body of the shovel and the tipping fulcrum of the traveling body, $D_4$ is a distance between a connecting point of the boom cylinder and the upper turning body and the tipping fulcrum, $F_1$ is a force exerted on the upper turning body by the boom cylinder, M is a weight of the vehicle body, and g is gravitational acceleration.

7. The shovel as claimed in claim 6, wherein the distances $D_4$ and $D_2$ or a ratio thereof is obtained based on the force $F_1$ at a time of the lift of the traveling body.

8. The shovel as claimed in claim 1, wherein a position of the tipping fulcrum is changed in accordance with an orientation of the upper turning body.

9. The shovel as claimed in claim 1, further comprising:
   an operating part configured to be operated by an operator to determine whether to enable the processor to correct or disable the processor from correcting the motion of the boom cylinder of the attachment in such a manner as to control the lift of the rear of the traveling body with the front of the traveling body serving as the tipping fulcrum.

10. The shovel as claimed in claim 1, wherein the processor is further configured to correct the motion of the boom cylinder of the attachment in such a manner as to control a lift of the front of the traveling body with the rear of the traveling body serving as the tipping fulcrum.

* * * * *